(12) United States Patent
Tankielun et al.

(10) Patent No.: US 10,003,989 B1
(45) Date of Patent: Jun. 19, 2018

(54) MEASURING DEVICE, MEASURING SYSTEM AND MEASURING METHOD FOR OVER THE AIR POWER MEASUREMENT AND INDICATION

(71) Applicant: Rohde & Schwarz GmbH & Co. KG, Munich (DE)

(72) Inventors: Adam Tankielun, Ottobrunn (DE); Alexander Pabst, Taufkirchen (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 0 days. days.

(21) Appl. No.: 15/371,959

(22) Filed: Dec. 7, 2016

(51) Int. Cl.
*H04B 17/00* (2015.01)
*H04W 24/08* (2009.01)
*H04B 17/318* (2015.01)
*G08B 21/18* (2006.01)
*G08B 5/36* (2006.01)

(52) U.S. Cl.
CPC .............. *H04W 24/08* (2013.01); *G08B 5/36* (2013.01); *G08B 21/182* (2013.01); *H04B 17/318* (2015.01)

(58) Field of Classification Search
None
See application file for complete search history.

(56) References Cited

U.S. PATENT DOCUMENTS

| | | | |
|---|---|---|---|
| 2003/0224806 A1* | 12/2003 | Hebron | H04W 24/00 455/457 |
| 2010/0277363 A1* | 11/2010 | Kainulainen | G01S 3/023 342/174 |
| 2011/0012775 A1* | 1/2011 | Richards | H01Q 1/38 342/146 |
| 2014/0019913 A1* | 1/2014 | Newman | G06F 3/0488 715/810 |
| 2014/0132270 A1* | 5/2014 | Olsson | G01V 3/107 324/329 |
| 2016/0226607 A1 | 8/2016 | Tankielun | |
| 2016/0286543 A1* | 9/2016 | Putterman | H04W 76/021 |
| 2016/0306025 A1* | 10/2016 | Nicolas | G01S 5/0252 |

FOREIGN PATENT DOCUMENTS

CN 2299398 Y 12/1998

* cited by examiner

*Primary Examiner* — Mohammad Rachedine
(74) *Attorney, Agent, or Firm* — Ditthavong & Steiner, P.C.

(57) ABSTRACT

A measuring device for over the air power measurements is provided. It comprises a power sensor unit, which is configured for measuring a power of a signal emitted by a device under test over the air and an indication unit which is configured for indicating the measured power optically. Moreover, the measuring device comprises a common housing, which encompasses the power sensor unit and the indication unit.

5 Claims, 4 Drawing Sheets

MEASURING DEVICE, MEASURING SYSTEM AND MEASURING METHOD FOR OVER THE AIR POWER MEASUREMENT AND INDICATION

TECHNICAL FIELD

The invention relates to performing over the air measurements, espatially over the air power measurements of signal emitting devices under test.

BACKGROUND ART

When performing power measurements, this is usually done in a test chamber. So as not to influence the measurement by stray emissions, the test chamber is insulated against electromagnetic radiation. One or more test antennas are usually placed within the test chamber and receive signals from a device under test, which is also placed in the test chamber. In order to evaluate the measured signals, they are usually guided to the outside of the test chamber through wave guides, for example coaxial cables. At the interface from the inside to the outside of the test chamber, there exists a possibility of stray electromagnetic radiation entering the test chamber and influencing the measurement.

For example the US patent application US 2016/0226607 A1 shows a measurement system having a number of measurement antennas. There, the individual measurement antenna transmits its measurement signal wirelessly to a receiver. This receiver though needs to be placed within a test chamber not disclosed in this document, since a transmission of signals to the outside is not possible due to the insulation against electromagnetic radiation. Having the receiver inside the test chamber though is also disadvantageous, since it takes up space within the test chamber and needs to operate without an interface of its own to the outside of the test chamber.

Accordingly, one object of the present invention among others is to provide a measuring device, measuring system and measuring method for performing over the air measurements, especially power measurements while requiring only a low-cost hardware set up but achieving a high measuring accuracy.

SUMMARY OF THE INVENTION

According to a first aspect of the invention, a measuring device for over the air power measurements is provided. It comprises a power sensor unit, which is configured for measuring a power of a signal emitted by a device under test over the air and an indication unit which is configured for indicating the measured power optically. Moreover, the measuring device comprises a housing, which encompasses the power sensor unit and the indication unit. By optically indicating the measured power, it is possible for an operator to see on first glance, which power is measured by the measuring device. Also it is possible to record this optical indication and derive the measured power therefrom.

According to a first preferred implementation form of the first aspect, the indication unit is a light emitting diode or a lamp. The indication unit is then configured for indicating the power measured by the power sensor unit by color and/or brightness and/or blinking frequency of the light emitting diode or the lamp. This allows for a very simple construction of the indication unit.

In a further preferred implementation form of the first aspect, the indication unit is a two-dimensional light emitting diode display or a two-dimensional organic light emitting diode display. The indication unit is then configured for indicating the power measured by the power sensor unit by color and/or grey scale value and/or brightness and/or blinking frequency and/or shading and/or texture and/or displayed numerical value on the two-dimensional light emitting diode display or the two-dimensional organic light emitting diode display. This allows for displaying a higher degree of information than with the diode according to the previous implementation form.

According to a further preferred implementation form of the first aspect, the indication unit is configured for displaying an identification number of the measuring device. This allows for differentiating between several employed measurement devices.

According to a further preferred implementation form of the first aspect, the measuring device moreover comprises an energy-harvesting unit, which is configured for harvesting energy from ambient electromagnetic radiation and/or ambient light and/or vibration and/or ambient temperature, and powering the measuring device. It is thereby possible to operate the measuring device in a self-contained manner without having to store great amounts of energy.

According to a further preferred implementation form of the first aspect, the common housing comprises a first side and an opposite second side. The power sensor unit is arranged on the first side of the common housing and configured for receiving the signal emitted by the device under test from a direction the first side points to, and the indication unit is arranged on the second side of the common housing. An interference between accidental electromagnetic radiation from the indication unit and the power sensor unit can thereby be prevented. This also allows for easy visibility of the indication unit, since the device under test cannot block the view.

According to a further preferred implementation form of the first aspect, the power sensor module comprises at least one antenna configured for receiving the signal emitted by the device under test and a processing unit, configured for determining the power of the signal emitted by the device under test from the received signal emitted by the device under test. This allows for a simple construction of the power sensor module.

According to a further preferred implementation form of the first aspect, the power sensor module comprises a narrow-band antenna and/or a broadband antenna. This allows for a very flexible use of the measuring device.

According to a further preferred implementation form of the first aspect, the measuring device comprises a wireless interface or a wired interface configured for communicating with a central processing unit. This allows for a simple control of the measuring device and for a simple data gathering from the measuring device.

According to a second aspect of the invention, a measuring system comprising at least two measuring devices according to the first aspect is provided. This allows for simultaneously measuring electromagnetic radiation generated by the device under test in two different directions with regard to the device under test.

According to a first implementation form of the second aspect, the measuring system comprises a central processing unit, which is connected to the at least two measuring devices by a wireless or wired connection. The central processing unit is then configured for communicating with the at least two measuring devices by the wireless or the wired connection. Additionally the at least two measuring devices are configured for transmitting the determined power values to the central processing unit by the wireless or wired connection. In addition to optically displaying the measured power values by the indication units of the measuring devices, this allows for a simple post-processing and further handling of the determined power values.

According to a further preferred implementation form of the second aspect, the measuring system moreover comprises at least one camera, which is configured for recording images of the indication units of the at least two measuring devices and a central processing unit, which is configured for storing and/or processing the recorded images of the indication units of the at least two measuring devices. This allows for automatically further processing the determined power values without needing a wired or wireless interface from the inside to the outside of a test chamber.

According to a further preferred implementation form of the second aspect, the central processing unit is configured for determining the power values determined by the at least two measuring devices from the recorded images of the indication units of the at least two measuring devices. This allows for a very simple operation of the measuring system, since an operator does not have to manually deduce and record power values from the indication units.

According to a further preferred implementation form of the second aspect, the central processing unit is configured for determining spatial positions of the at least two measuring devices from the recorded images of the indication units of the at least two measuring devices and storing the determined spatial position of each of the at least two measuring devices along with the power values determined by the central processing unit from the recorded images of the indication units of the at least two measuring devices. This allows for a very simple determining of a spatial characteristic of the emissions of the device under test.

According to a third aspect of the invention, a measuring method for over the air power measurements is provided. The measuring method comprises measuring a power of a signal emitted by a device under test over the air by a power sensor unit of a measuring device and indicating the measured power optically by an indication unit of the measuring device. The power sensor unit and the indication unit are arranged in a common housing of the measuring device. By optically indicating the measured power, it is possible for an operator to see on first glance, which power is measured by the measuring device. Also it is possible to record this optical indication and derive the measured power therefrom.

BRIEF DESCRIPTION OF THE DRAWINGS

An exemplary embodiment of the invention is now further explained by way of example only with respect to the drawings, in which.

DETAILED DESCRIPTION OF THE PREFERRED EMBODIMENTS

Figure 1:
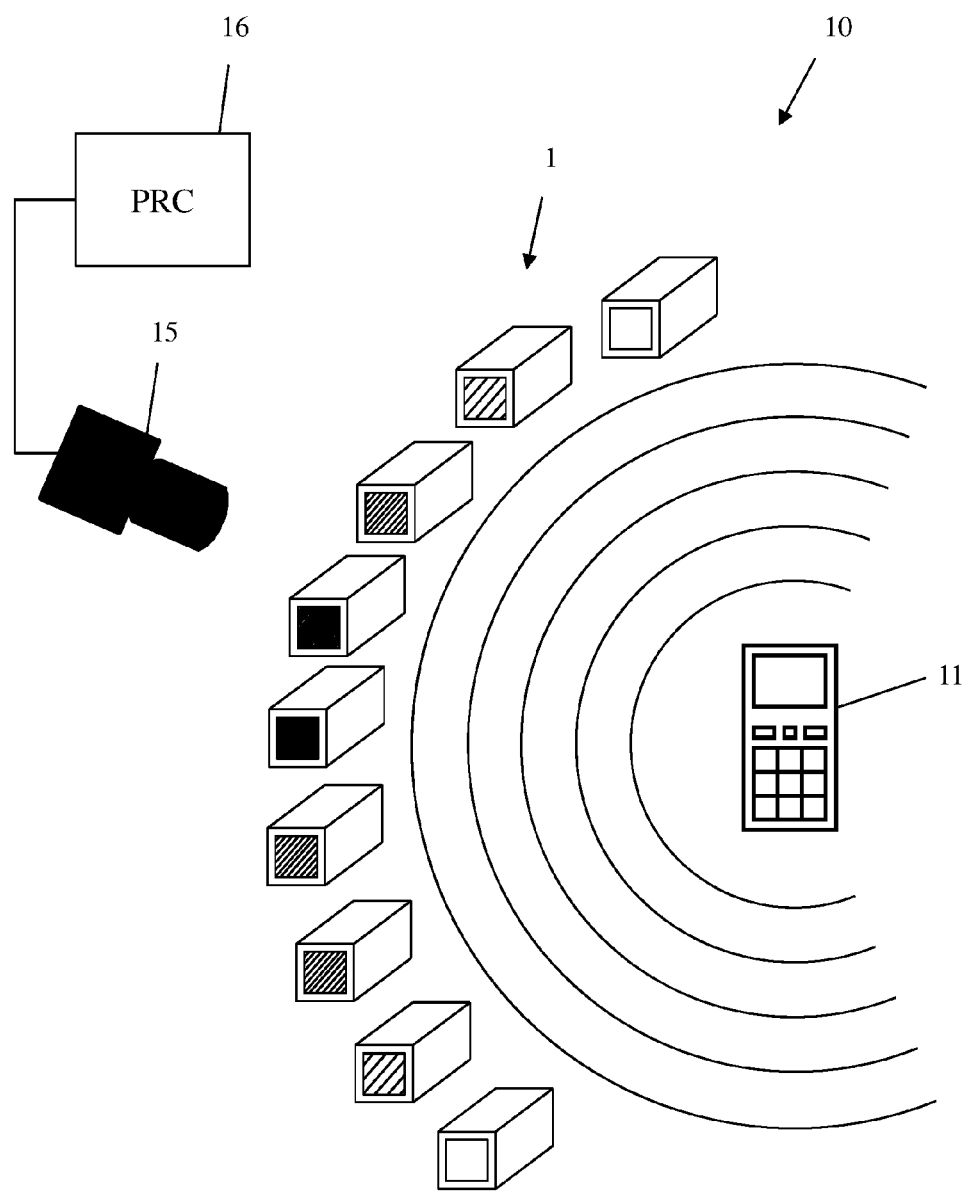
FIG. 1 shows a first embodiment of the measuring system according to the second aspect of the invention.
Figure 2:
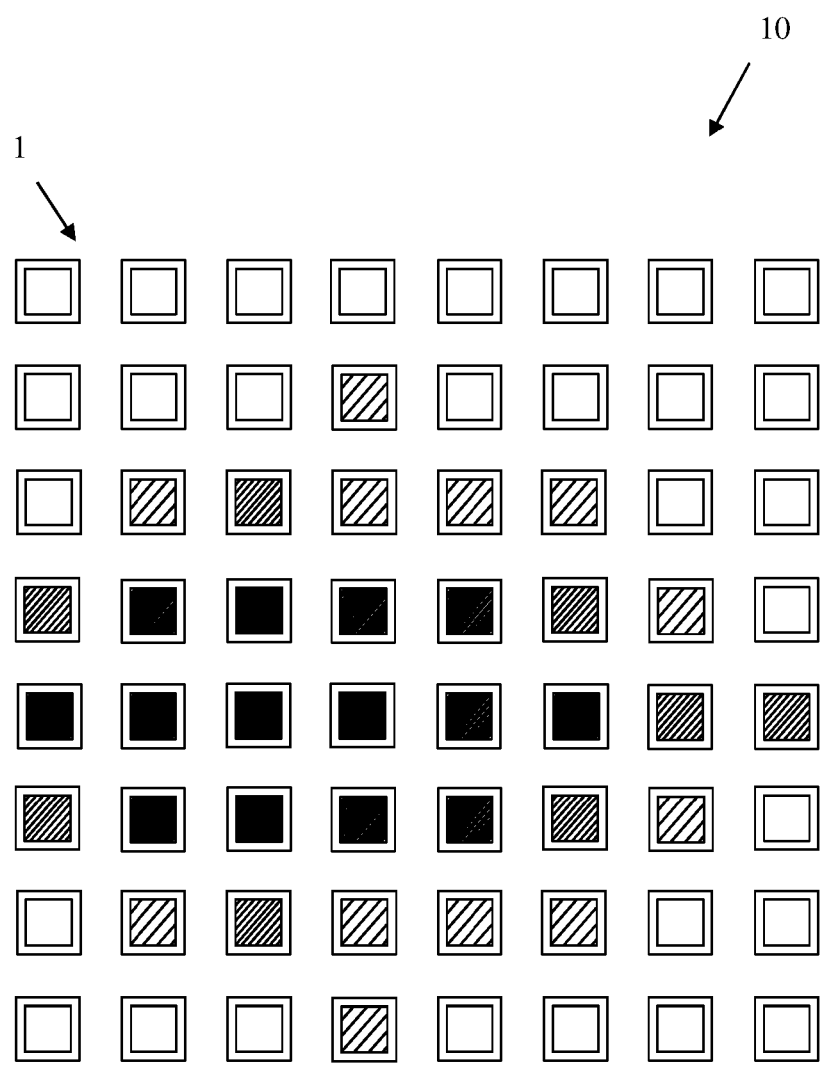
FIG. 2 shows a second embodiment of the measuring system according to the second aspect of the invention.

First we demonstrate the general construction and function of different embodiments of the measuring system according to the second aspect of the invention along FIG. 1 and FIG. 2. Along FIG. 3 and FIG. 4, the construction and function of different embodiments of the measuring device according to the first aspect of the invention is illustrated. Finally, along FIG. 5, the function of an embodiment of the measuring method according to the third aspect of the invention is described. Similar entities and reference numbers in different figures have been partially omitted.

Reference will now be made in detail to the preferred embodiments of the present invention, examples of which are illustrated in the accompanying drawings. However, the following embodiments of the present invention may be variously modified and the range of the present invention is not limited by the following embodiments.

First Embodiment

In FIG. 1, a first embodiment of the measuring system 10 according to the second aspect of the invention is shown. The measuring system 10 comprises a plurality of measuring devices 1, which each comprise a power sensor unit and an indication unit, which are not referenced individually, here. Moreover, the measuring system 10 comprises a camera 15 directed at the indication units of the measuring devices 1, and connected to the camera 15, a central processing unit 16.

A device under test 11 is placed on a first side of the measuring devices 1, which all face towards the device under test 11 with their respective first side. The power sensor unit of the respective measuring device 1 is arranged on the first side of the respective measuring device 1. On a second side of the measuring devices 1, which is opposite to the respective first side, the indication units are arranged. This second side of the measuring devices 1 faces towards the camera 15. The camera 15 is configured so that the indication units of all measuring devices 1 are within its view.

When performing a measurement, the device under test 11 emits a signal, which is to be measured. The signal is received by the power sensor units of the measuring devices 1 and measured thereby. Regarding the function of the power sensor units, it is referred to the elaborations regarding FIG. 3 and FIG. 4.

The indication units of the measuring devices 1 then indicate the measured power of the signal optically. In the example depicted here, the indication unit can be a light-emitting diode or a lamp or a two-dimensional light-emitting diode display or a two-dimensional organic light-emitting diode display or a two-dimensional thin-film crystal display. Here, the individual measuring devices 1 each have measured a different power of the signal emitted by the device under test 11. This is due to the fact that the individual measuring devices 1 are arranged at different spatial positions surrounding the device under test 11. It is thereby possible to determine the spatial characteristic of the power of the signal emitted by the device under test 11. By displaying the power on the individual indication units, it is possible for a user to see on first glance the power distribution of the signal.

For example, the power is displayed by the individual indication units through brightness, color, grey scale, shading, texture, blinking rhythm or frequency, a numerical value, etc.

In addition, the camera 15 records the images of the indication units of the measuring devices 1. These images are then handed on to the central processing unit 16, which is adapted to reproduce the power value measured by the individual measuring device 1 from the image recorded by the camera 15. In addition, optionally the central processing unit can derive a spatial position of the individual measuring device 1 from the images recorded by the camera 15. The spatial information and the respectively determined power value are then stored together, so that they can be jointly processed later on.

Second Embodiment

In FIG. 2, a second embodiment of the measuring system 10 is shown. Here, only a grid of measuring devices 1 showing different power levels is depicted. Also the device under test 11 is not depicted here for reasons of clarity.

It can easily be seen here that there is a clearly visible center of highest power and a power distribution. Towards the edges of the grid, the measured power is lowest. This is shown here by having a black shading at the measuring device of highest power and a white shading at the measuring devices of lowest power.

Instead of shadings, as explained earlier, also different colors, textures, blinking frequencies or blinking rhythms, etc. can be used. It is also possible to directly display a numerical value of the measured power on the respective indication unit. This is further explained along FIG. 4.

It is to be noted that the measuring system 10 can additionally comprise a test chamber, which surrounds the device under test 11, and the measuring devices 1. The camera 15 can be mounted outside the test chamber and view the indication units of the measuring devices 1 through a window of the test chamber. Alternatively, the camera can be fixedly installed in a wall of the test chamber or within the test chamber. In the latter two cases, a cable or wireless connection through the wall of the test chamber exists between the camera and the central processing unit 16.

Alternatively, a plurality of cameras can be used. In this case each camera might only view a part of the plurality of measuring devices 1. Alternatively, each camera could view all measuring devices 1, but from a different angle. In this case, it is possible to deduce not only a two-dimensional spatial position as with one camera, but it is possible to deduce a three-dimensional position of the individual measuring devices 1.

Third Embodiment

Figure 3:
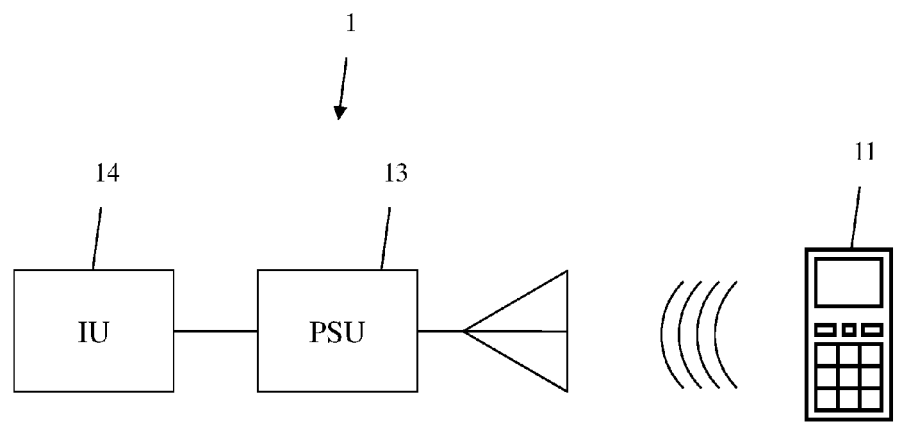
FIG. 3 shows a first embodiment of a measuring device according to the first aspect of the invention in a block diagram.

In FIG. 3, an embodiment of the measuring device 1 of the first aspect of the invention is shown. The measuring device 1 comprises a power sensor unit 13, which is connected to an indication unit 14. The power sensor unit 13 comprises an antenna directed towards the device under test 11. As already explained earlier, the power sensor unit 13 is arranged on a first side of the measuring device 1, which points towards the device under test 11, while the indication unit 14 is arranged on a second side of the measuring device 1, which is opposite to the first side.

Fourth Embodiment

Figure 4:
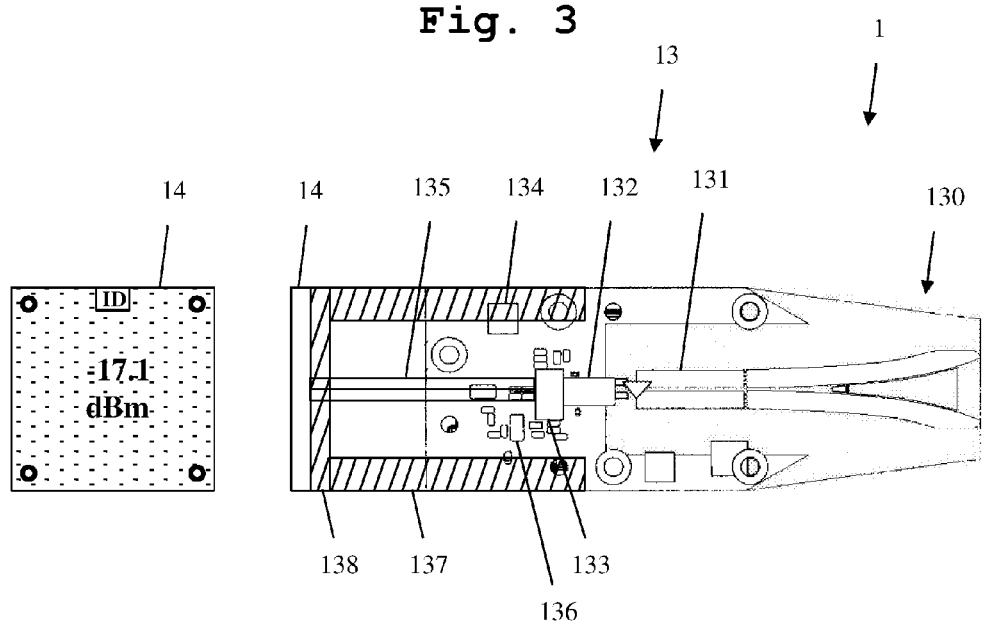
FIG. 4 shows the second embodiment of the measuring device according to the first aspect of the invention in a construction-oriented diagram.

In FIG. 4, a second embodiment of the measuring device 1 of the first aspect of the invention is shown. Here, a more detailed view of the construction is shown. On the right side of FIG. 4, a cut-open view of the measuring device 1 is depicted. This includes the power sensor unit 13 and the indication unit 14. On the left side of FIG. 4, a view from the second side is shown. This corresponds to viewing the right part of FIG. 4 from the left side.

In FIG. 4, espatially the construction of the power sensor unit 13 is shown in detail. The power sensor unit 13 comprises an antenna 130, for example a slot line antenna, espatially a tapered slot line antenna on a circuit board. The antenna 130 is connected to a power detector 131, which is also arranged on the circuit board. The power detector moreover is connected to a chopper 132, which again is connected to a digitizer and microprocessor 133. The digitizer and microprocessor 133 moreover are connected to an energy-harvesting unit 136 and a temperature sensor 134. Moreover, they are connected to the indication unit 14 through a power supply connection 135. The left side of the power sensor unit 13 is covered in absorber material 137. The indication unit 14 is connected to the power sensor unit 13 by a display holder 138.

When performing a measurement, the antenna 130 receives the signal from the device under test 11. The received signal is handed to the power detector 131, which determines the power of the signal. For example, the power detector 131 is a diode detector.

The power signal is then handed to the chopper, which performs a chopping of the signal. This is useful for counteracting interference. Interference within the chopped signal cancels out later on.

The chopped signal is handed to the digitizer and microprocessor 133, which digitizes the signal and determines the final power value of the signal. Finally, the microprocessor takes a present temperature of the power sensor unit 13, which is provided by the temperature sensor 134 into account when preparing the final power value. The final power value is then displayed by the indication unit 14, as explained earlier.

The indication unit 14 and the power sensor unit 13 are for example powered by an energy-harvesting unit 136 which harvests environmental energy. This can be for example electromagnetic radiation, light, vibration, sound, ambient heat, etc. In addition, the energy-harvesting unit can also comprise a battery, for storing energy for later use.

Alternatively, the measuring device 1 can also be powered directly by a battery without the use of an energy-harvesting unit 136. In a further alternative, the measuring device 1 can be powered by a cable connected power supply.

On the left side of FIG. 4, some more details of the display of the power value by the indication unit 14 is shown. Here, a numerical value of −17.1 dBm is depicted centrally. Over the entire surface of the indication unit 14, a shading which is dependent upon the power value is depicted. Moreover, in an upper area, an ID number of the measuring device 1 depicted. This is useful when recording a number of power values, as shown in FIG. 1 and FIG. 2 in order to keep the different power values from the different measuring devices 1 apart.

Figure 5:
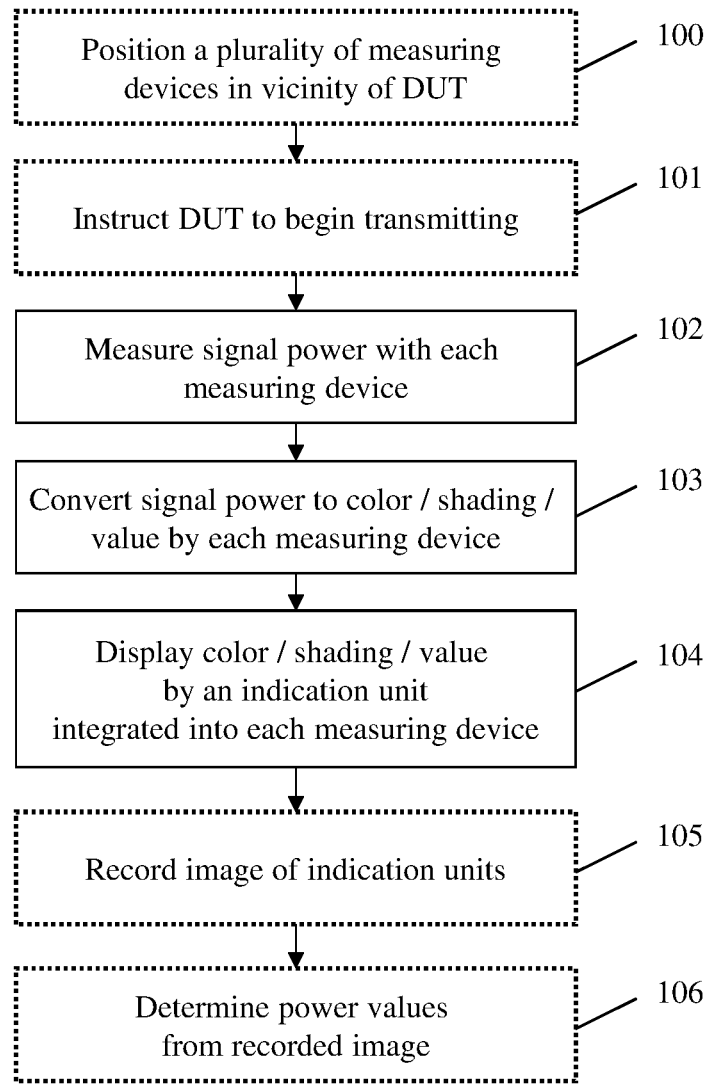
FIG. 5 shows an embodiment of the measuring method according to the third aspect of the invention.

Finally, in FIG. 5, an embodiment of the measuring method according to the third aspect of the invention is shown as a flow chart. In a first optional step 100, a plurality of measurement devices are positioned in vicinity of a device under test. In a second optional step 101, the device under test is instructed to begin transmitting. In a third step 102, the power of the transmitted signal is measured by each measurement device. In a fourth step 103, the signal power is converted to a color or shading or numerical value or any other respective representation as explained earlier, by each measuring device. In fifth step 104, the respective representation of the signal power is displayed by the respective measuring device. In an optional sixth step 105, an image of the indication units of the measuring devices is recorded. In a final optional step 106, the power value determined by the individual measuring devices is deduced from the recorded image.

The embodiments of the present invention can be implemented by hardware, software, or any combination thereof. Various embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

Various embodiments of the present invention may also be implemented in the form of software modules, processes, functions, or the like which perform the features or operations described above. Software code can be stored in a memory unit so that it can be executed by a processor.

The memory unit may be located inside or outside the processor and can communicate date with the processor through a variety of known means.

The invention is not limited to the examples. The characteristics of the exemplary embodiments can be used in any advantageous combination.

Although the present invention and its advantages have been described in detail, it should be understood, that various changes, substitutions and alterations can be made herein without departing from the spirit and scope of the invention as defined by the appended claims.

What is claimed is:

1. A measuring system comprising:
    at least two measuring devices, each measuring device comprising:
        a power sensor, configured for measuring a power of a signal emitted by a device under test over the air;
        an indicator, configured for indicating the measured power optically; and
        a common housing;
        wherein the power sensor and the indicator are arranged in the common housing;
    at least one camera, configured for recording images of the indicators of the at least two measuring devices, and
    a central processor, configured for storing and/or processing the recorded images of the indicators of the at least two measuring devices.

2. The measuring system according to claim 1, comprising:
    the central processor connected to the at least two measuring devices by a wireless or wired connection,
    wherein the central processor is configured for communicating with the at least two measuring devices by the wireless or wired connection, and
    wherein the at least two measuring devices are configured for transmitting the determined power values to the central processor by the wireless or wired connection.

3. The measuring system according to claim 2,
    wherein the central processor is configured for determining the power values determined by the at least two measuring devices from the recorded images of the indication units of the at least two measuring devices.

4. The measuring system according to claim 3, wherein the central processor is configured for:
    determining spatial positions of the at least two measuring devices from the recorded images of the indicators of the at least two measuring devices, and
    storing the determined spatial position of each of the at least two measuring devices along with the power values determined by the central processor from the recorded images of the indicators of the at least two measuring devices.

5. A measuring method for over the air power measurement, comprising:
    measuring a power of a signal emitted by a device under test over the air by a power sensor of a measuring device,
    indicating the measured power optically by an indicator of the measuring device,
    wherein the power sensor and the indicator are arranged in a common housing of the measuring device, and
    wherein at least one camera records images of the indicators of the at least two measuring devices, and wherein a central processor stores and/or processes the recorded images of the indicators of the at least two measuring devices.

* * * * *